April 7, 1931.                D. C. GILBERT                1,800,065
             DITCH CLEANING AND ROAD GRADING MACHINE
                Filed June 28, 1929     3 Sheets-Sheet 1

D. C. Gilbert
INVENTOR
BY Victor J. Evans
ATTORNEY

April 7, 1931. D. C. GILBERT 1,800,065
DITCH CLEANING AND ROAD GRADING MACHINE
Filed June 28, 1929 3 Sheets-Sheet 2
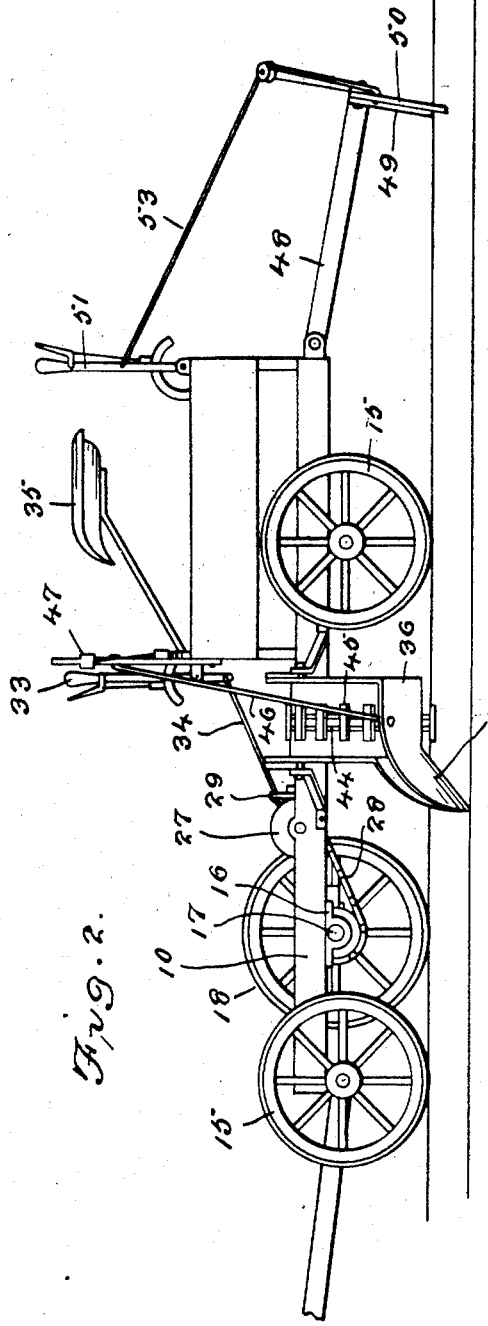
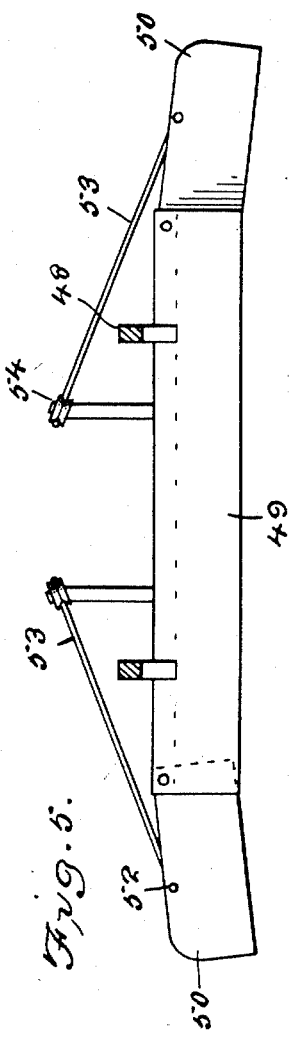
D. C. Gilbert INVENTOR
BY Victor J. Evans ATTORNEY

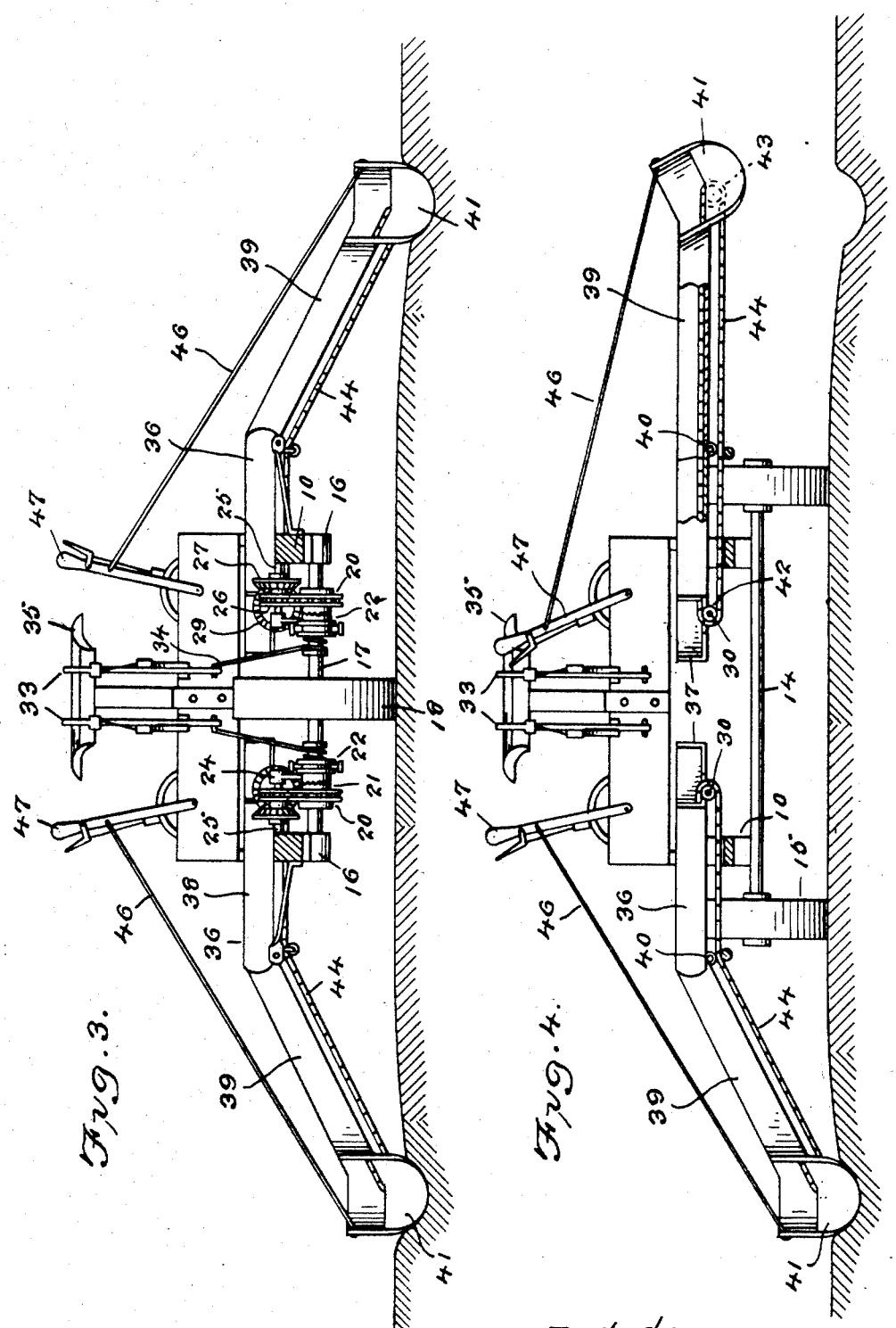

Patented Apr. 7, 1931

1,800,065

UNITED STATES PATENT OFFICE

D. C. GILBERT, OF THOMASVILLE, GEORGIA

DITCH-CLEANING AND ROAD-GRADING MACHINE

Application filed June 28, 1929. Serial No. 374,590.

The present invention relates to ditchers and graders and has for one of its principal objects to simultaneously scoop the dirt out of a ditch and deposit it upon the road while grading the same into a proper contour.

Another object is the improvement of machines of the above character.

Other objects are simplicity of construction and operation.

Other objects and advantages will appear from the following specification and will be set forth in the appended claims, and I do not wish to be limited in the scope of my invention except as I shall be limited by said claims.

In the drawings:

Figure 2 is a side elevation thereof.

Figure 3 is a front elevation, with parts in section, with the ditchers lowered into operative position.

Figure 4 is a view similar to Figure 3, showing one of the ditchers raised to horizontal position and out of operation.

Figure 5 is a detail view of the grader.

Figure 1:
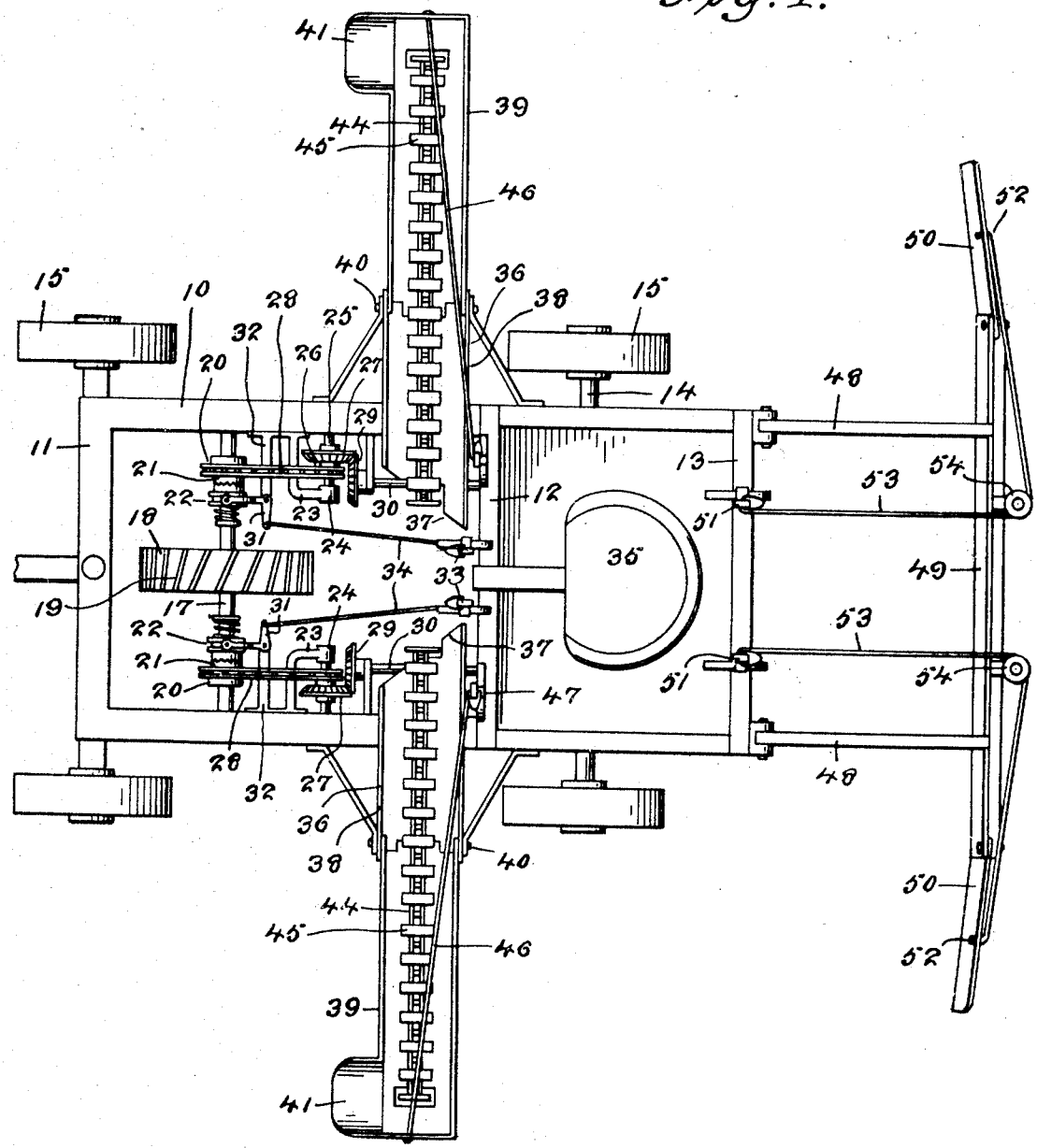
Figure 1 is a plan view of my combined ditcher and grader.

Referring to the drawings in detail, the same reference characters designating the same parts in all figures thereof, 10 designates side frame members which are connected by cross members 11, 12 and 13 and to which are connected the axles 14 of the wheels. Extending transversely between the frame members 10 and journaled thereupon as at 16 is a shaft 17 upon which is secured for rotation therewith a power wheel 18 having transverse cleats 19 thereon to increase the frictional contact with the roadway. Loosely mounted upon the shaft 17 are sprocket carrying sleeves 20 having clutch surfaces 21 at one end thereof, said clutch surfaces being preferably in the form of serrations or teeth. Clutch boxes 22 are slidably but nonrotatably mounted upon the shaft 17, having clutch surfaces adapted to cooperate with the clutch surfaces of the sleeves 20 and being spring-pressed normally into engagement therewith.

Extending from the side frames rearwardly of said shaft are elbowed arms 23 on the ends of which are formed journal boxes 24 cooperating with aligned journal boxes on the side frames to which the arms are attached to support short shafts 25, upon which are mounted sprocket wheels 26 and bevel gears 27, the sprocket wheels being rotatably connected by sprocket chains 28 with the sprockets on the sleeves 20, and the bevel gears being in mesh with similarly beveled gears 29 secured on shafts 30 extending longitudinally of the frame. The clutch boxes 22 are retractable to disengage them from the sleeves 20 by means of bell crank levers 31 pivoted to arms 32 extending from the sides of the frame and connected to hand levers 33 by rods 34, said hand levers being located within reach of an operator on the driver's seat 35.

Extending laterally from the frame on both sides thereof are trough members 36 which extend inwardly from the edge of the frame and are beveled outwardly toward the front thereof at their inner ends 37. These troughs are made in two sections, one of which 38 is stationary and the other 39 is pivoted thereto at 40 so that it may be raised or lowered, as shown in Figures 3 and 4. The outer ends of the sections 39 are provided with scoops 41 which may be let down on the sides of the road and may be projected into a ditch, as shown in Figures 2, 3 and 4, for forming said ditch or for cleaning it of sediment or weeds. Adjacent the inner and outer ends of these troughs and flush with the bottoms thereof are sprocketed rollers 42 and 43 about which are trained endless chains 44 having conveyor cleats 45 attached thereto in uniformly spaced relation to each other. The rollers 42 at the inner ends of the troughs are mounted on the shafts 30 for rotation therewith. The outer ends of the hinged sections 39 of the troughs are connected through rods 46 or other suitable means, with hand levers 47 operating transversely of the machine and in reach of the driver's seat. As the dirt is scooped up out of the ditches by the scoops 41 it passes rearwardly and is carried up the incline of the trough sections 39 by the endless conveyors and is dumped at its inner ends in a ridge centrally of the roadway as the machine passes along.

At the rear of the frame members 10 are pivotally mounted beams 48 to which is attached at their outer ends a scraper board 49 which may be of wood or metal to suit the requirements of a given condition, and said board 49 carries at its ends and pivotally mounted thereon supplemental members 50 which will extend downwardly over the sloping sides of the road to grade the same evenly. The side members 50 may be raised either singly or both together by means of hand levers 51 connected to intermediate points 52 of said members by means of flexible connections 53 secured to the hand levers and passing around pulleys 54 so that the operator may raise the same to avoid obstructions, or for any other reason.

When the machine is to be put out of use and conveyed to another locality, it will appear from the foregoing that both the troughs and the grading boards may be raised off the ground to prevent injury thereof.

It is believed that the operation of the device will be quite apparent from the above description and its advantages will be appreciated by those skilled in the art to which the invention belongs.

Having described my invention, what I claim is:

1. In a device of the character described, a movable frame having troughs extending laterally therefrom, said troughs having scoops on their outer ends, means for raising and lowering the troughs relative to the ground, endless conveyors in said troughs for carrying materials scooped up toward the center of the frame and depositing the same in the middle of the road, means for moving said endless conveyors, means on the rear of the machine for smoothing out and grading up the material so deposited.

2. In a device of the character described, a frame mounted for locomotion on a roadway, troughs extending laterally from said frame and each having a pivoted section, scoops on the ends of the pivoted sections, endless conveyors mounted longitudinally of the troughs and being adapted to travel along the bottom thereof, a wheel having frictional contact with the ground and having operative connection with said endless conveyors for operating the same, the inner ends of said troughs being spaced apart at the center of the frame.

3. In a device of the character described, a movable frame, laterally extending troughs on said frame having scoops at their outer ends, said troughs being formed in pivotally connected sections, endless conveyors in said troughs adapted to travel along the bottom thereof and to carry dirt scooped up by said scoops to the center of the frame and dump it on the roadway, sprocketed rollers at one end of said endless conveyors, a wheel mounted on said frame in frictional contact with the ground, gear mechanism adapted to be placed in rotative connection with said wheel for operating said conveyors, and means on the rear of the frame for leveling the dirt conveyed to the center of the road by said conveyors.

4. In a device of the character described, a frame adapted to be moved along the roadway, troughs extending from said frame to the side of the road, having scoops at their outer ends, said troughs having pivoted sections at their outer ends adapting the scoops to be lowered into contact with the ground, means in said troughs for conveying dirt scooped up by the scoops to the center of the frame and for dumping it on the roadway, and means at the rear of the frame to level the dirt deposited in the road by said conveyors.

In testimony whereof I affix my signature.

D. C. GILBERT.